(12) United States Patent
Whited et al.

(10) Patent No.: US 9,518,328 B1
(45) Date of Patent: Dec. 13, 2016

(54) CORROSION INHIBITING GEL

(71) Applicant: Cortec Corporation, St. Paul, MN (US)

(72) Inventors: Tim Whited, Nederland, CO (US); Margarita Kharshan, Little Canada, MN (US); Kristy Gillette, Spring Valley, WI (US); Boris Miksic, North Oaks, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 14/986,756

(22) Filed: Jan. 4, 2016

Related U.S. Application Data

(63) Continuation of application No. 13/412,089, filed on Mar. 5, 2012, now abandoned.

(60) Provisional application No. 61/449,327, filed on Mar. 4, 2011.

(51) Int. Cl.
| | | |
|---|---|---|
| *C23F 11/14* | (2006.01) | |
| *C23F 11/04* | (2006.01) | |
| *C23F 11/00* | (2006.01) | |
| *C23F 11/173* | (2006.01) | |

(52) U.S. Cl.
CPC .......... *C23F 11/173* (2013.01); *C23F 11/141* (2013.01); *C23F 11/142* (2013.01); *C23F 11/143* (2013.01)

(58) Field of Classification Search
CPC .................................................. C23F 11/143
See application file for complete search history.

(56) References Cited

U.S. PATENT DOCUMENTS

| | | | | |
|---|---|---|---|---|
| 3,727,688 | A * | 4/1973 | Clampitt ................ | 166/283 |
| 4,090,013 | A | 5/1978 | Ganslaw et al. | |
| 4,210,166 | A | 7/1980 | Munie | |
| 4,422,947 | A * | 12/1983 | Dorsey et al. ................ | 507/111 |
| 4,640,622 | A | 2/1987 | Sortwell | |
| 4,665,987 | A * | 5/1987 | Sandiford et al. ............ | 166/288 |
| 4,778,280 | A | 10/1988 | Brazelton | |
| 4,925,616 | A | 5/1990 | Brown et al. | |
| 4,939,203 | A * | 7/1990 | Marrocco .................... | 524/557 |
| 5,018,871 | A | 5/1991 | Brazelton et al. | |
| 5,135,908 | A | 8/1992 | Yang et al. | |
| 5,190,374 | A | 3/1993 | Harms et al. | |
| 5,218,011 | A * | 6/1993 | Freeman .................... | 523/173 |
| 6,444,595 | B1 * | 9/2002 | Elkouh et al. ................ | 442/76 |
| 6,686,414 | B1 | 2/2004 | Anderson et al. | |
| 7,125,441 | B1 * | 10/2006 | Furman et al. ............ | 106/14.42 |
| 7,264,707 | B1 * | 9/2007 | Furman et al. ............ | 205/730 |
| 2005/0059306 | A1 * | 3/2005 | Elkouh et al. ................ | 442/118 |
| 2005/0065215 | A1 * | 3/2005 | Biering et al. ................ | 514/566 |
| 2008/0286471 | A1 * | 11/2008 | Doubleday .................. | 427/337 |
| 2011/0286706 | A1 * | 11/2011 | Greenwood et al. ........ | 385/107 |

* cited by examiner

*Primary Examiner* — Joseph D Anthony
(74) *Attorney, Agent, or Firm* — Haugen Law Firm

(57) ABSTRACT

A gel-forming corrosion inhibiting composition may be employed to protect a metal article from corrosion. The gel-forming corrosion inhibitor composition is combined with water and delivered to an enclosed space at least partially defined by the metal article. Subsequent to delivery, the combination forms a gel to sustainably fill the enclosed space, thereby protecting the metal article from corrosion.

15 Claims, No Drawings

CORROSION INHIBITING GEL

CROSS-REFERENCE TO RELATED APPLICATIONS

This application is a continuation of U.S. patent application Ser. No. 13/412,089, filed on Mar. 5, 2012 and entitled "Corrosion Inhibiting Gel", which itself claims priority to U.S. Provisional Patent Application Ser. No. 61/449,327, filed on Mar. 4, 2011 and entitled "Corrosion Inhibiting Gel," the contents of which being incorporated herein in their entirety.

FIELD OF THE INVENTION

This invention relates to corrosion inhibiting gel compositions useful for protecting metal articles.

BACKGROUND OF THE INVENTION

Metal tubing is commonly used for both structural elements and for pipelines to transport materials, with selection of the specific metal or alloy dependent on the required material properties and cost effectiveness. Unfortunately, most metals are susceptible to corrosion processes, especially when exposed to water, salts, acids, and/or air. This is especially true of most types of steel. If uncontrolled, corrosion can lead to loss of structural integrity. As a result, a wide range of technologies have been developed to prevent, monitor, and/or control corrosion of metallic structures.

In some applications, a metal pipeline passes through a second metal pipe or conduit called a casing. The casing typically provides protection to the inner pipeline. Problems arising from corrosion can be particularly challenging in casing applications due to the range of corrosion processes that can occur individually and synergistically with the casing and the pipeline. A number of approaches have been attempted to prevent or control corrosion in such situation.

Metal pipe, conduit, and casing may have a permanent protective coating applied to interior and/or exterior surfaces to prevent corrosion. Urethane or epoxy based coating products are commonly used. This approach is generally effective, but corrosion can still initiate at any defects in the coating and migrate under the coating.

Cathodic protection is another approach often applied to pipelines and other metallic structures. Cathodic protection controls the corrosion of a metal surface by making it the cathode of an electrochemical cell. Impressed current cathodic protection and galvanic cathodic protection are the two types of cathodic protection techniques that are typically used to control the external corrosion on pipelines. The effectiveness of cathodic protection can be reduced by electrical contact between the protected structure (the carrier pipe) and other metals (e.g. the pipe casing). Therefore, non-conducting "spacers" are frequently used to prevent such electrical contact between the pipe and the casing. The casing may be vented to the atmosphere, but is otherwise usually sealed to the external environment to prevent incursion of air or water into the interstitial space between the pipe and the casing.

A passive approach to corrosion inhibition of the carrier pipe involves filling the interstitial space with a highly dielectric material to physically exclude air and water and to improve the electrical separation between the pipe and the casing. Common commercial filler products are generally petroleum based compositions containing wax; examples include STOPAQ™ Casing Filler (Stopaq BV), Royfill Hot Fill and Royfill 404-B (both from the Chase Corporation, Royston Laboratory Division), and Trenton Fill-coat #1 (The Trenton Corporation). Another example is described in U.S. Pat. No. 4,925,616 regarding compositions based on tall oil pitch. For most of the above products, the material must be heated for injection into the interstitial space; which adds to the cost and complexity of installation. Also, any voids or defects in the filling have the potential to compromise the corrosion protection, through action of entrained moisture and oxygen on the carrier pipe surface. While the above filler materials tend to be relatively non-toxic and non-hazardous, they are still fairly difficult to remove and clean-up, as they are viscous to solid at ambient temperatures and are not water soluble.

The above fillers are typically dielectric and shield the carrier pipe from the benefits of cathodic protection current applied to the pipe casing. Corrosion inhibitors may be added to these filler formulations to reduce corrosion on the carrier pipe but the long-term effectiveness of the corrosion inhibitors may be questionable due to the high temperature of the filler during the initial installation process, which can degrade the corrosion inhibitors, and the restrictions of inhibitor migration through the dielectric filler materials.

Thus, there remains a need for materials that can provide pro-active corrosion protection as an electrically conducting volume filler in the interstitial space between a pipeline and the casing to permit cathodic current flow from the pipe casing to the carrier pipe.

It is therefore an object of the present invention to provide an electrically conducting volume filler for application between spaced-apart metallic articles to convey cathodic protection current from the first metallic article (or article portion) to the second metallic article (or article portion).

It is a further object of the present invention to provide a volume filler for placement in the interstitial space between a pipeline and is casing, which volume filler promotes corrosion inhibition of both the pipeline and the casing.

It is another object of the present invention to provide a volume filler with active corrosion inhibiting agents dispersed therein, which filler may be easily installed in the space between corrosion-susceptible articles or article portions.

It is a yet further object of the present invention to provide a corrosion inhibiting volume filler that is inexpensive, non-hazardous, easy to apply, and easy to remove and/or clean up.

SUMMARY OF THE INVENTION

The present invention provides a composition for protecting metal articles from corrosion, comprising a corrosion inhibitor and a gel forming agent which are mixed with water and applied to a space proximate to the metal article. The mixture subsequently becomes a gel, and is particularly effective for use in preventing corrosion of metal articles within the interstitial space of cased pipelines. If necessary, the gel may be relatively easily removed by dissolving the gel in water, with the resultant solution being non-toxic and therefore inexpensive for disposal.

The composition of the present invention may be water-based, contrary to conventional approaches for corrosion inhibition of metal articles. However, the present composition provides an electrically conductive medium to convey cathodic current across a space between metal articles or separated portions of a single article. By being capable of conveying such cathodic current, the protective current need only be applied to a single one of the multiple metal articles or spaced-apart portions of a single metal article. For the purposes hereof, the electrical conductivity of the composition may be expressed in terms of "resistivity". Because the present compositions may typically be water-based, the electrical resistivity is generally based upon the electrical resistivity of groundwater (not deionized water) which is understood to be less than about $10^4$ Ω·m. It should be understood, however, that ions naturally present in the water used in the formation of compositions or ions supplied to the compositions from, for example, cross-linking agents or pH adjusters may further affect the electrical resistance of the composition. Generally, it is an object of the invention to attain an electrically conductive composition that exhibits an electrical resistance that is at least one order of magnitude less than the electrical resistance of organic filler materials that are typically employed in pipe corrosion protection applications.

Moreover, the present composition may be relatively easily removed from its installation in a non-toxic and environmentally compatible manner through the application thereto of solubilizing water. This approach significantly simplifies and reduces the cost of removing the corrosion inhibiting volume filler in the event that inspection, repair, or disposal of the metal articles is necessary.

DETAILED DESCRIPTION

The objects, features, and advances represented by the present invention will now be presented in terms of detailed embodiments. Other embodiments and aspects of the invention are recognized as being within the grasp of those having ordinary skill in the art.

The present invention provides a composition for protecting metal articles from corrosion, comprising a corrosion inhibitor and a gel forming agent which are mixed with water and applied to a space proximate to the metal article. The mixture subsequently becomes a gel to substantially fill or occupy the space. The corrosion inhibitor component provides long term mitigation of corrosion of the metal article while the gel matrix substantially prevents the infiltration of air and water into the filled space. This combination is particularly effective for use in preventing corrosion in cased pipelines, but may also be used, for example, inside of tubular tower structures such as cell phone towers to control corrosion for extended time periods. The invention provides the further advantage that the composition is easily removed for servicing or demolition of the metal article, and waste disposal of the solubilized gel is non-toxic and inexpensive.

"Vapor phase corrosion inhibitors", as used herein, refer to corrosion inhibiting compounds, which have sufficient vapor pressure to migrate in the vapor phase to surfaces not in direct contact with the applied compounds. These inhibitors are also effective if in direct contact with a surface.

Examples of vapor phase corrosion inhibitors which have been found effective for use in connection with the present invention include amine and ammonium salts of organic acids, alkali and amine dibasic acid salts, ammonium salts of tribasic acids, and tall oil imidazolines.

"Migratory corrosion inhibitors", as used herein, refer to corrosion inhibiting compounds, which are sufficiently soluble in water to migrate freely through aqueous solutions, pastes, gels and wet solids.

Examples of migratory corrosion inhibitors which have been found highly effective for use in connection with the present invention include amine and ammonium salts of organic acids and amine salts of inorganic acids.

Vapor phase and migratory corrosion inhibitors are particularly effective in the present compositions for long-term continuous protection of metal articles from corrosion. They provide liquid, vapor-phase, and interphase protection from corrosion, and are designed to migrate under disbonded coatings and provide corrosion protection. They are generally believed to create a thin (possibly monomolecular) inhibiting layer on metal surfaces, which resists biological attacks and is self healing if mechanically damaged. Further, selected inhibitors are non-flammable, non-toxic, nitrite- and phosphate-free, and generally considered to be environmentally compatible.

The corrosion inhibitor component may comprise about 0.1% to about 20% by weight of the final gel composition when mixed with water, and more preferably between about 0.5% and about 5% by weight of such composition. Any suitable corrosion inhibitor may be utilized in the present compositions, including any of the above listed materials or any mixture thereof.

The following corrosion inhibitor formulations set forth example formulations determined to be useful in the compositions of the present invention. However, the following formulations are not intended to be limiting of the various inhibitor formulations that may be used in the present compositions.

| Component | % by weight |
|---|---|
| Formulation 1 | |
| Cyclohexylammonium Benzoate | 3-5% |
| Ammonium Benzoate | 12-15% |
| Sorbitan Monolaurate, ethoxylated | 2-3% |
| Water | 77-84% |
| Formulation 2 | |
| Cyclohexylammonium Benzoate | 5-10% |
| Monoethanol Ammonium Benzoate | 15-20% |
| Salt of Tall Oil Hydroxyethyl Imidazoline | 1-5% |
| Water | 65-70% |
| Formulation 3 | |
| Ammonium Benzoate | 80-90% |
| Sodium Alkylnaphthalene Sulfonate | 5-10% |
| Triethanolammonium Nitrate | 1-5% |
| Formulation 4 | |
| Monoethanol Ammonium Benzoate | 15-20% |
| Triethanolammonium Salt of Isonanoic Acid | 25-35% |
| Water | 45-60% |

The term "gel" as used herein is defined as a substantially dilute cross-linked system, consisting primarily of liquid yet which exhibits solid-like properties. Gels formed with water as the liquid component are commonly referred to as hydro gels or hydro colloids. The gel forming agent is a material which is readily dissolved or dispersed in the liquid under certain conditions and which forms a cross-linked system. The cross-linking may originate from, for example, covalent, ionic, hydrophilic, or hydrophobic interactions between functional groups on the gel forming agent. Gels formed due to the latter three interactions may be reversible under certain conditions. Many gels will revert to a non-gelled state at elevated temperature. The physical properties of gels and the rate of formation can be affected by a number of factors including: temperature, pH, concentration of gel forming agent, type/concentrations of liquid components, type/concentrations of salts, and the presence of other additives. The onset of gel formation ("gelling" or "gelation") is usually evidenced by a rapid increase in viscosity by a factor of at least 10. Shearing or agitation of the gel at this stage may result in delay of further gelling or reversion to a more fluid state. Likewise, agitation or flow may prevent or delay the onset of gel formation of a liquid mixture under otherwise suitable conditions. Upon more complete gel formation, the gel may demonstrate properties of solids including: lack of flow under the force of gravity or applied force/ pressure, resistance to mechanical force (for a probe pushed against or into the gel), elasticity, and ability to form a free-standing mass that can be cut or broken.

A readily flowable/pumpable fluid will typically have a viscosity in the range of about 0.5 to about 2000 centipoise (cP) under ambient conditions, more preferably less than 1000 cP, and most preferably less than 100 cP. Upon initiation of gelling, the viscosity may rapidly increase to >10,000 cP. Note however that accurate and repeatable measurement of viscosity may be difficult with a system forming a gel due to the rapid change of viscosity over time as well as the effects of the measurement device/method on the gelling process. For a fully gelled system, typical measures of fluid viscosity may no longer be practical. Equipment designed for characterization of visco-elastic properties of solids are well known in the art and can be used to characterize gels. A common test used to characterize gelled systems is called the Bloom test. In the test, a specific probe is forced into the gel at a constant speed to a depth of 4 mm. The required force is measured as a function of penetration depth, and the data is useful to compare the physical properties of different gel systems.

The gel-forming agent component of the present compositions may be one or more of a variety of materials. An example such material is a super absorbent polymer (SAP), which is a polymer that can absorb and retain up to about 500 times its own weight of liquid, and includes polymers that can form super absorbent polymers with the addition of suitable cross-linking agents. Water absorbing SAPs are classified as hydro gels when cross-linked. The ability of SAPs to absorb liquid, such as water, is a factor of the ionic concentration of the aqueous solution, as the presence of valence cations in the solution impedes the ability of the polymer to bond with the water molecule. The total absorbency and swelling capacity are controlled by the type and degree of cross-linkers used to make the gel. Low density cross-linked SAPs generally exhibit a higher absorbent capacity and swell to a larger degree than relatively higher-density cross-linked SAP materials. The higher cross-linking density limits the absorbent capacity of the SAP.

Superabsorbent polymers are commonly prepared through the polymerization of acrylic acid blended with sodium hydroxide in the presence of an initiator to form a poly-acrylic acid sodium salt (sometimes referred to as sodium polyacrylate). Other materials are also used to make superabsorbent polymers, such as polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile.

Additional examples of suitable water-superabsorbent polymers include starch-grafted polyacrylates; guar gum, optionally crosslinked; starch-grafted acrylamide/acrylic acid, including sodium and potassium salts of such polymers; starch-acrylonitrile graft copolymers; sodium and potassium salts of carboxymethlycellulose; chitosan/polyvinylpyrrolidone and chitosan/polyethyleneimine combinations; and carboxymethlycellulose. SAPs present a suitable component of the gel forming agent of the present compositions, due to both cost and performance.

Other materials that may be used as the gel forming agents of the present invention include alginic acid, sodium alginate, potassium alginate, ammonium alginate, calcium alginate, agar, carrageenan, locust bean gum, pectin, gelatin, and poly anionic or poly cationic polymers.

The gel forming agent may be present in the compositions in an amount ranging from about 1% to about 50% by weight, relative to the total weight of the water dispersion and preferably from about 1% to about 20% by weight of the water dispersion. The combination of the gel-forming agent, corrosion inhibitor, and water typically form a dispersion, at least initially. The terms used herein for such combination, however, are not intended to be limiting as to the character thereof. Accordingly, such combination may be referred to herein as a dispersion, mixture, or blend, for example.

In some embodiments of the invention, the composition may include a viscosity modifying polymer or mixture thereof. Examples of suitable viscosity modifying polymers include anionic or nonionic polysaccharides such as guar gums and derivatives, cellulose, starch, and galactomannan gums, as well as polyvinyl alcohols, polyacrylates, polypyrrolidones and polyacrylamides and mixtures thereof. In addition, the polymer may be a block or random copolymer containing units selected from vinyl alcohol, acrylates, including the (meth)acrylates, pyrrolidone, 2-acrylamido-2-methylpropane sulfonate and acrylamide including the (meth)acrylamides, cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethlecellulose, carboxymethylcellulose and carboxymethylhydroxyethyl cellulose. Useful polysaccharides may also include microbial polysaccharides such as xanthan, succinoglycan and scleroglucan as well as galactomannan gums and derivatized galactomannan gums. Such materials may also serve a secondary role as a processing aid, by improving the handling properties of the gel forming agent and/or enhancing the dispersibility of the gel forming agent in liquid.

The compositions of the invention may further contain a crosslinking agent. The crosslinking agent may comprise a borate ion releasing compound, an organometallic or organic complexed metal ion comprising at least one transition metal or alkaline earth metal ion, as well as mixtures thereof, such as Zr (IV) and Ti (IV), such as is described in U.S. Patent application Publication No. 2008/0085843, herein incorporated by reference. Example useful crosslinking agents include reagents, such as organometallic and organic complexed metal compounds, which can supply zirconium IV ions such as, for example, zirconium lactate, zirconium lactate triethanolamine, zirconium carbonate, zirconium acetylacetonate, zirconium ammonium carbonate and zirconium diisopropylamine lactate, as well as compounds that can supply titanium IV ions such as, for example, titanium ammonium lactate, titanium triethanolamine, and titanium acetylacetonate. Additionally, Zr (IV) and Ti (IV) may be added directly as ions or oxy ions into the composition. Further, the compounds may be supplied as inorganic oxides, such as zirconium or titanium dioxide. Such crosslinking agents are typically used at a pH in the range from about 6 to about 13. Any suitable crosslinking agent or mixture of such agents may be employed in the compositions of the present invention.

Suitable crosslinking agents for SAPs based on polyacrylates or other polymers of alpha, beta-ethylenically unsaturated mono- or dicarboxylic acids and acid anhydrides (such as acrylic acid, methacrylic acid, crotonic acid, maleic acid/anhydride, itaconic acid, fumaric acid) include any substance that reacts with the hydrophilic groups of the aqueous solution polymer. The selection and concentration of crosslinking agent affects the absorbent rate and capacity. Although any of the variety of known crosslinking agents may be employed, such as those described in U.S. Pat. Nos. 4,090,013 and 6,686,414 herein incorporated by reference, the use of zirconium ions alone or admixed with ferric aluminum, chromic or titanium ions as well as aziridine have been found to be particularly useful. A particularly useful crosslinking agent is ammonium zirconyl carbonate commercially available as Bacote 20 and Zirmel 1000, from Magnesium Elektron, Inc, Flemington, N.J. An aziridine crosslinking agent is available from Zeneca Resins, Wilmington, Mass. as Neocryl CX-100. The aqueous crosslinking agent is added to the aqueous polyacrylate solution at a concentration ranging from about 2 parts to about 10 parts, preferably from about 2 parts to 8 parts and most preferably from about 4 parts to 6 parts. Once dried, this amount corresponds to a weight ratio of about 10 parts polymer to about 1 part crosslinking agent, based on polymer solids.

In some embodiments, the composition may further contain microbial inhibitors.

In some embodiments, the composition may further include additives to reduce the freezing point of the composition. Glycols such as ethylene and propylene glycol may be used in this invention to prevent water freezing and subsequent expansion.

The corrosion inhibitor may be provided as a liquid concentrate. The gel forming agent may be provided as a dispersible powder or granular solid, and the corrosion inhibitor and gel forming agent components mixed with liquid and applied to the delivery target as a gel-forming mixture. The mixture will setup into a gel consistency after installation. It is contemplated that the "setup" or gelation time to reach a final gel consistency may be controlled through adjustment of the relative component concentrations of the composition with dispersant liquid, such as water.

As set forth in the examples hereinbelow, applicant has surprisingly discovered that increased corrosion inhibitor concentration, within a range, reduces "setup" or gelation time. Moreover, increased corrosion inhibitor concentration beyond an upper threshold of such range ceases to significantly reduce gelation time. Consequently, applicants have surprisingly discovered that: (1) corrosion inhibitor concentration affects gelation time of the present compositions in water; and (2) the effect of corrosion inhibitor concentration on gelation time is significant only within a critical concentration range. The present compositions, therefore, may typically include corrosion inhibitor within a concentration range that is effective in inhibiting corrosion and provides a suitable gelation time that is greater than the time needed to deliver the desired volume of flowable mixture to the delivery target. In some applications of the present invention, the compositions may be mixed or dispersed in water at specific relative concentrations to establish a gelation time that is greater than the time necessary to install the mixture or dispersion at the protection site proximate to the corrosion-susceptible article. In other words, the mixture or dispersion is provided with component concentrations suitable to establish a gelation time that is greater than the anticipated installation/delivery time of the mixture/dispersion to its final destination. In such a manner, the mixture/dispersion may be fully delivered to the destination space prior to gelation. Such a characteristic is desirable, in that delivery of the fluidous/flowable mixture/dispersion is significantly easier and more effective than delivery of a material in a gelled consistency, due to the substantially lower viscosity of the pre-gelled fluidous mixture/dispersion.

In some embodiments, the corrosion inhibitor may be provided as a liquid concentrate, and the gel forming agent as a powder or granular solid. The corrosion inhibitor may be pre-diluted in liquid (e.g. in a mixing tank) or metered into a liquid stream continuously to achieve the desired final concentration. Typically, it is desirable to disperse the gel forming agent into a flowing liquid stream in a continuous process, so as to provide a maximum time period to deliver the mixed fluid before gel formation occurs. Processes and equipment for metering and rapidly dispersing granular solids into a liquid stream are commercially available and well known in the art. Examples may be found in U.S. Pat. Nos. 4,210,166, 4,640,622, 4,778,280, 5,018,871, 5,135, 908, and 5,190,374, each incorporated herein by reference. The delivery pump may be any standard liquid pump, selected based upon standard engineering criteria such as fluid viscosity, desired flow rate, and back pressure. For any applications involving changes in fluid elevation, the pump and connecting plumbing may be appropriately constructed to handle the resulting head pressure or suction. Such equipment may also be used in alternate embodiments, such as those in which some or all of the corrosion inhibitor is provided as a solid, added together with the gel forming agent to the liquid.

In one example approach, a sample of the final composition may be prepared by hand mixing the corrosion inhibitor, water, and gel forming agent in the anticipated concentration ratios, and the gelation time then observed. If the gelation time is acceptable for the anticipated installation/delivery time, preparation and delivery of the final composition with the anticipated use ratios is performed. If, on the other hand, the observed gelation time of the sample is not acceptable, the formulation may be adjusted to obtained longer or shorter gelation times, and the process repeated until an acceptable final composition/gelation time is obtained.

While it is preferable to substantially completely fill the delivery space for protecting the proximate metal article, small voids and gaps are not expected to lead to performance failure, due to the migratory properties of the corrosion inhibitors of the present compositions. It may be desirable to seal the enclosed space to prevent ingress of contaminants and/or loss or dehydration of the gel. However, the gel formed through the compositions of the present invention are typically sustainable over long periods of time even without air or liquid-tight seals.

Any suitable mixing and pumping equipment can be used with the invention to deliver the gel-forming composition to the corrosion protection space. Typically, the percentage of gel forming agent is adjusted for the specific application to achieve the desired gelation time. For many applications, a gelation time of about 2 hours is preferable, which is achieved with a gelling agent loading of about 8% (by weight of final composition). A base or buffer may be added to the composition to maintain the system at a favorable pH (pH 7 or higher) so as to obtain optimal gel formation.

Example
A gel-forming composition was prepared as follows:

| Component | Supplier | Description | % |
|---|---|---|---|
| PD8081H | H.B. Fuller | Superabsorbent Polymer (SAP) | 23.73 |
| Bacote 20 | MEL Chemicals | AZC crosslinker | 1.27 |
| Natrosol | Hercules | Hydroxyethyl cellulose | 75% |

In order to make the system easy to handle and apply, a "filler" was added until the consistency of the mixture was powder/granular. Hydroxyethyl cellulose was selected due to its function as a reology modifier to form a gel with the SAP. The ratio of Hydroxyethyl cellulose:SAP solution was about 3:1.

The corrosion inhibitor from Formulation 1 was incorporated with water and the gel-forming composition above in the following amounts:
Gel-forming composition: 1 g
Corrosion inhibitor (Formulation 1): 1.8 g
Water: 10.2 g
The components were mixed by hand stirring in ajar for 2 minutes.

Dispersal of the gel-forming composition in the water and corrosion inhibitor mixture provided a gelation time of about 105 minutes. The resultant gel provided contact phase protection and vapor-phase protection as demonstrated by VIA Results. Vapor Inhibitor Ability (VIA) is tested according to a modified version of Federal Standard 101C, Method 4031, Procedure B.

In brief, material containing vapor phase inhibitor is placed in proximity to a cleaned surface of steel (carbon steel plugs; SAE 1010 CR 22S 698⅝ in.x½ in. hollow, METASPEC Company) in a container at 40° C. and a controlled relative humidity (via solution of 3% glycerol in the bottom of the jar) for two hours. Samples are then visually inspected relative to a control sample and graded from 0 to 3 with 0 indicating no corrosion inhibiting and 3 indicating good corrosion inhibition. A score of 2 or 3 is considered passing.

VIA testing of the gel resulted in a grade 3 versus a grade 0 for the control.

Additional testing was performed on different gelation mix ratios, as set forth in the following Table 1, wherein "SA" is the gel-forming composition of the Example, and "CI" is the corrosion inhibitor Formulation 1:

TABLE 1

| Mass SA | Mass H₂O | Mass CI | Time for Gelation |
|---|---|---|---|
| 1 g | 5 g | | 15 min |
| 2 g | 5 g | | 2 min |
| 3 g | 5 g | | 30 s |
| 5 g | 5 g | | 30 s |
| 1 g | 1 g | | 20 s |
| 1 g | 2 g | | 40 s |
| 1 g | 3 g | | 2.5 min |
| 1 g | 4 g | | 6 min |
| 1 g | | 1 g | <30 s |
| 1 g | | 2 g | <30 s |
| 1 g | | 3 g | <30 s |
| 1 g | | 4 g | <30 s |

TABLE 1-continued

| Mass SA | Mass H₂O | Mass CI | Time for Gelation |
|---|---|---|---|
| 1 g | | 5 g | <30 s |
| 1 g | | 7 g | 30s s |
| 1 g | | 10 g | 6 min |
| 1 g | | 15 g | >45 min |
| 1 g | | 8 g | 2 min |
| 1 g | | 9 g | 4 min |
| 1 g | | 12.5 g | 20 min |
| 1 g | 1.9 g | 0.1 | 15 s |
| 1 g | 3.8 g | 0.2 | 20 s |
| 1 g | 5.7 g | 0.3 | 1.5 min |
| 1 g | 7.6 g | 0.4 | 10 min |
| 1 g | 9.5 g | 0.5 | >80 min |
| 1 g | 1.8 g | 0.2 | 10 s |
| 1 g | 3.6 g | 0.4 | 15 s |
| 1 g | 5.4 g | 0.6 | 1.5 min |
| 1 g | 7.2 g | 0.8 | 8 min |
| 1 g | 9.0 g | 1.0 | >60 min |
| 1 g | 1.7 | 0.3 | <15 s |
| 1 g | 3.4 | 0.6 | 15 s |
| 1 g | 5.1 | 0.9 | <1 min |
| 1 g | 6.8 | 1.2 | 3-5 min |
| 1 g | 7.65 | 1.35 | 15-20 min |
| 1 g | 8.5 | 1.5 | 30 min |
| 1 g | 9.35 | 1.65 | 45-60 min |
| 1 g | 10.2 | 1.8 | 105 min |
| 1 g | 11.05 | 1.95 | 180 min |
| 1 g | 11.9 | 2.1 | 420 min |
| 1 g | 8.5 | 1.5 | 25-30 min |
| 1 g | 6.8 | 1.2 | 5-7 min |
| 1 g | 7.65 | 1.35 | 12-20 min |
| 1 g | 8.0 | 2.0 | 27-34 min |

The "time for gelation" was determined by visual observation. A visible thickening of the mixture could be seen upon initiation of gelling. When a beaker could be inverted for >5 seconds with no loss of material, gelation was deemed complete.

It was found that the ingredients could also be mixed in a different combination to facilitate ease of use in the field. The SAP and the AZC crosslinker components may be mixed with the corrosion inhibitor solution (e.g. Formulation 1) and water to form a liquidous concentrate. Surprisingly, consistent gelling is not observed until the liquid concentrate is further mixed with the hydroxyethyl cellulose (viscosity modifying polymer), and production of a gel with substantially homogenous consistency is facilitated by adding the viscosity modifier component subsequent to the mixing of the gel-forming agent, the crosslinker, and the corrosion inhibitor solution. Therefore, the viscosity modifying polymer component may be added to the mixture immediately prior to installation of the gel-forming composition to maximize the available delivery time of the composition to the target destination prior to gelation. The observed gelation time is again dependent on the ratio of ingredients (including water) in the final mix.

The addition of a viscosity modifier as a key step in the initiation of a consistent gelation of a gel-forming composition is a surprising discovery by the Applicant. Specifically, it would otherwise be anticipated that the addition of a water-soluble gel-forming agent to an aqueous composition would initiate the formation of a gel with substantially homogenous consistency. Instead, Applicants have discovered that the addition of a viscosity modifier component initiates in earnest the consistent gelation of the gel-forming composition. In one approach, therefore, a "part A" of the composition containing the corrosion inhibitor solution and the gel-forming agent may be prepared in advance to be combined with a "part B" of the composition comprising the viscosity modifier and a cross-linking agent immediately prior to delivery of the fully mixed composition to the target destination (metal article-defined enclosure).

It is to be understood, however, that the addition of a viscosity modifier, such as hydroxyethyl cellulose, as well as the addition of a cross-linking agent, such as the AZC crosslinker, are not necessary in the formation of a corrosion inhibiting gel. It has been determined that the viscosity modifier and the cross linking agent may provide advantages of the final product, particularly in the homogeneity of the gelled product.

A corrosion inhibiting "glycol mix" was prepared from 15 parts by weight of "Formulation 1" corrosion inhibitor, 28.9 parts ethylene glycol, and 56.1 parts water for use in low-temperature (<0° C.) applications. This mixture displayed a freezing point of approximately −17° C. When mixed with the gel forming composition of the Example, satisfactory gelling was observed:

TABLE 2

| Mass SA | Mass glycol mix | Time for Gelation |
|---|---|---|
| 1 g | 8 g | 8-9 min |
| 1 g | 10 g | <33 min |

The gelled compositions of the present invention can typically be removed from the metal article enclosure with the use of pressurized water, and in some cases with hot water (~100-~200° F.). As an example, a delivery hose or tube is inserted through an opening in the metal article into the enclosure. Water flow is initiated to dissolve/break up the gel and carry it out of the opening in the metal article. The delivery tube is inserted further into the metal article as removal of the gel progresses. Multiple openings can be used to collect the water/gel discharge. In some instances, it may be possible to apply pressurized water to one opening of the metal article to force the gel out of a second opening. The discharged water/gel mixture is typically collected for disposal. However, the gel compositions are expected to be non-toxic and have minimal environmental impact if some is released into the environment.

The invention has been described herein in considerable detail in order to comply with the patent statutes, and to provide those skilled in the art with the information needed to apply the novel principles and to construct and use embodiments of the invention as required. However, it is to be understood that various modifications may be accomplished without the departing from the scope of the invention itself.

The invention claimed is:

1. A method for inhibiting corrosion of a metal article defining an enclosure, said method comprising:
   (a) providing a first mixture having:
      (i) 0.1-20% by weight of a corrosion inhibitor selected from the group consisting of amine and ammonium salts of organic acids, ammonium salts of tribasic acids, amine salts of inorganic acids, alkali and amine dibasic acid salts, tall oil imidazolines, and combinations thereof;
      (ii) 1-50% by weight of a water-soluble gel-forming agent including a super-absorbent polymer;
      (iii) a cross-linking agent reactable with hydrophilic groups of said gel-forming agent, wherein said cross-linking agent includes at least one of a zirconium ion donor and a titanium ion donor; and
      (iv) water;
   (b) providing a second mixture having a hydrophilic polymer viscosity modifier that is different from said water-soluble gel-forming agent;
   (c) combining said first and second mixtures into a combination having a gelation time that initiates upon combining said first and second mixtures into said combination; and
   (d) delivering said combination to the enclosure within a delivery time that is less than said gelation time.

2. A method as in claim 1 wherein said combination initially exhibits a pre-gel viscosity.

3. A method as in claim 2 wherein said gelation time is between 30 and 300 minutes.

4. A method as in claim 3 wherein, upon expiration of said gelation time, said combination attains a gel condition with a gel viscosity that is at least one order of magnitude greater than said pre-gel viscosity.

5. A method as in claim 4 wherein said gel viscosity is at least 10,000 cP at 20° C.

6. A method as in claim 5 wherein said pre-gel viscosity is between 0.5-2,000 cP at 20° C.

7. A method as in claim 1 wherein said corrosion inhibitor is present at about 2-3% by weight of said combination.

8. A method as in claim 1 wherein said hydrophilic polymer viscosity modifier is present in said combination at a weight ratio of about 3:1 of said viscosity modifier to said gel-forming agent.

9. A method as in claim 1 wherein the enclosure is between the metal article and another metal article.

10. A method as in claim 9 wherein the enclosure is between coaxial metal tubes.

11. A method as in claim 9 wherein said combination exhibits an electrical resistivity of less than $10^4$ Ω·m.

12. A method as in claim 11 wherein said combination facilitates cathodic corrosion protection to said metal articles.

13. A method as in claim 1, including removing the gelled combination from the enclosure by applying water to the gelled combination.

14. A method as in claim 13 wherein the removal water is at a temperature of at least 100° F.

15. A method as in claim 1, including combining said first and second mixtures immediately prior to delivering said combination to the enclosure.

* * * * *